(12) United States Patent
Bosse et al.

(10) Patent No.: US 12,366,452 B2
(45) Date of Patent: Jul. 22, 2025

(54) MAP ANNOTATION MODIFICATION USING SPARSE POSE GRAPH NODE UPDATES

(71) Applicant: Zoox, Inc., Foster City, CA (US)

(72) Inventors: Michael Carsten Bosse, Templeton, CA (US); Qi Fu, Walnut Creek, CA (US); Elena Stephanie Stumm, Berkeley, CA (US)

(73) Assignee: Zoox, Inc., Foster City, CA (US)

( * ) Notice: Subject to any disclaimer, the term of this patent is extended or adjusted under 35 U.S.C. 154(b) by 467 days.

(21) Appl. No.: 17/891,952

(22) Filed: Aug. 19, 2022

(65) Prior Publication Data

US 2024/0094009 A1 Mar. 21, 2024

(51) Int. Cl.
*G01C 21/32* (2006.01)
*G06T 7/246* (2017.01)

(52) U.S. Cl.
CPC .............. *G01C 21/32* (2013.01); *G06T 7/248* (2017.01); *G06T 2207/30241* (2013.01); *G06T 2207/30252* (2013.01)

(58) Field of Classification Search
CPC ..................... G01C 21/32; G06T 7/248; G06T 2207/30241; G06T 2207/30252
See application file for complete search history.

(56) References Cited

U.S. PATENT DOCUMENTS

| 2004/0039524 A1* | 2/2004 | Adachi | .............. G01C 21/3889 |
| | | | 701/410 |
| 2018/0188026 A1* | 7/2018 | Zhang | ................ G01C 21/3635 |
| 2018/0293466 A1* | 10/2018 | Viswanathan | ..... G01C 21/3602 |

FOREIGN PATENT DOCUMENTS

| EP | 1429117 A1 * | 6/2004 | ............. G01C 21/30 |
| EP | 1429117 B1 | 3/2010 | |
| WO | 2018126083 A1 | 7/2018 | |

OTHER PUBLICATIONS

PCT Search Report and Written Opinion mailed Nov. 20, 2023 for PCT Application No. PCT/US2023/029521from PCT Summary, 11 pages.

* cited by examiner

*Primary Examiner* — Anil K Bhargava
(74) *Attorney, Agent, or Firm* — Lee & Hayes, P.C.

(57) ABSTRACT

Relocating and/or re-sizing map elements using an updated pose graph without introducing abnormalities to the map data may comprise determining a transformation between a source node of a first pose graph and a target node of a second pose graph and determining a modification to a map element based at least in part on the transformation. The techniques may include determining a stress on the map based at least in part on one or more modifications to map elements and determining if the stress meets or exceeds a threshold. In instances where the stress meets or exceeds a threshold, a modification may be altered, reversed, and/or indicated in a notification transmitted to a user interface.

20 Claims, 8 Drawing Sheets

MAP ANNOTATION MODIFICATION USING SPARSE POSE GRAPH NODE UPDATES

BACKGROUND

An autonomous vehicle can navigate in an environment at least partially based on a map of the environment. Such an autonomous vehicle may comprise sensors, such as lidar sensors, which can be used to obtain data representative of the environment, with the data then used in a mapping process to generate a map or update an existing map. However, errors in the map or mapping process can create unsafe situations for those systems which rely on accurate maps, such as in the case with autonomous vehicles, as an example. Moreover, the process of updating and correcting such a map may be computationally intensive and/or require extensive manual input.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
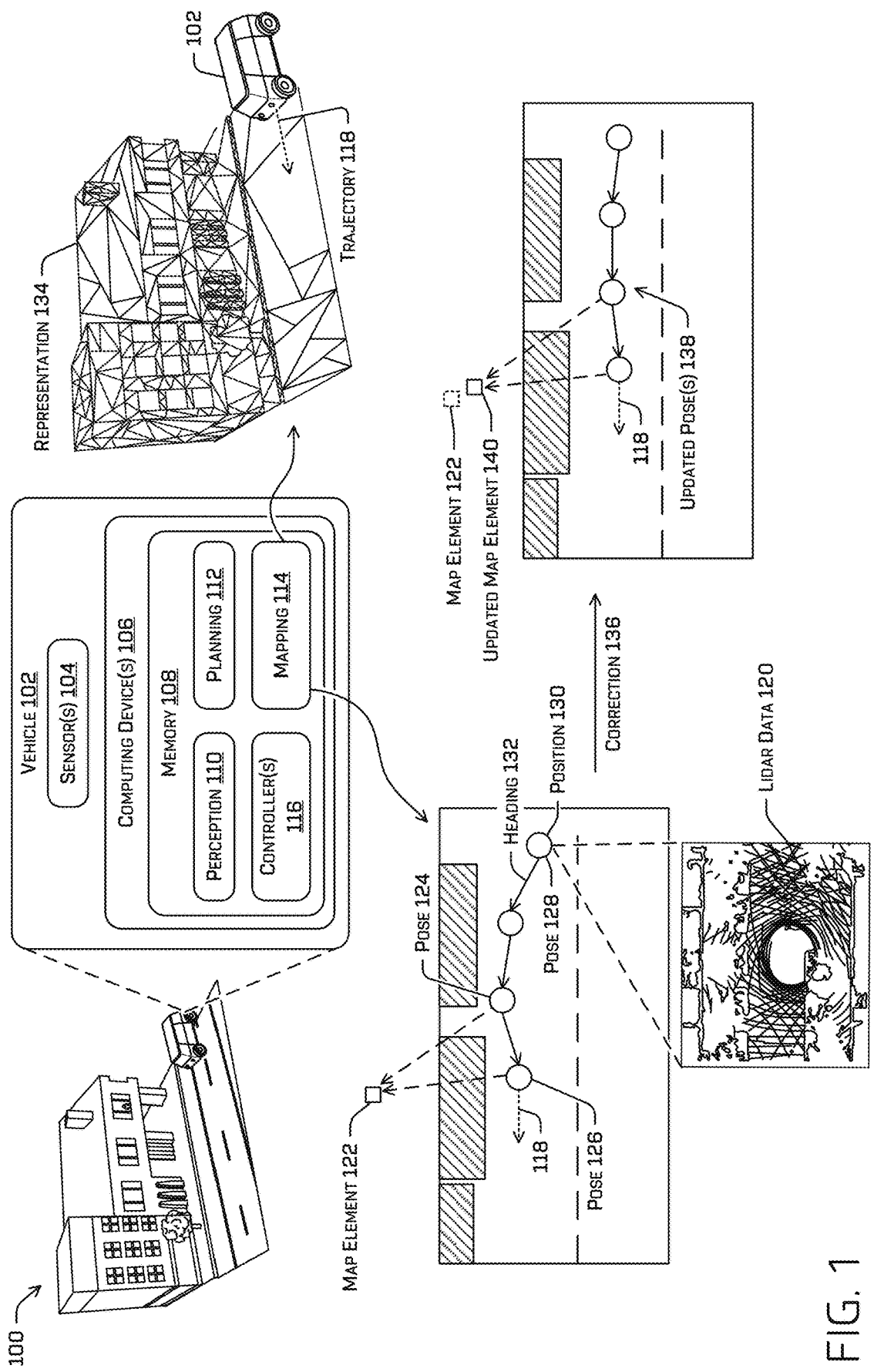
FIG. 1 illustrates an example scenario in which an autonomous vehicle may receive sensor data associated with an environment that may be used to generate a pose graph estimating a vehicle position, orientation, and/or trajectory. The pose graph and sensor data may be used to generate a map of the environment, including annotations (map elements) identifying key representations of objects/regions in the map.

As discussed above, sensor data may be collected to generate a map of an environment, but adjusting map annotations that indicate a location and/or extents (size/dimensions) of features in an environment may be labor-intensive, error-prone, and computationally expensive. For example, one of the errors introduced by adjusting map elements may include map "tearing" or other abnormalities where incongruent or "blank" space may be introduced to the map by automated techniques for modifying map elements. The techniques discussed herein reduce errors, the need for manual input, and the computational load to update map element(s) across map data representing an environment, including reducing map tearing. In some examples, the map element(s) may be updated when new sensor data has been received from a vehicle. This new sensor data may be used to update and/or correct a pose graph that may have previously been generated by using the new sensor data in a re-optimization of the pose graph. In an additional or alternate example, the update to the pose graph may be determined based at least in part on a next iteration of an optimization process applied to the pose graph and/or a modification to the optimization process (e.g., changing parameters of the optimization, such as changing the error function or constraints). More specifically, an autonomous vehicle may transmit sensor data to a remote computing device, which may use the sensor data to generate a map of the environment. Such a map may comprise, for example, a two—dimensional representation that identifies a location and/or region associated with a semantic label. According to more rudimentary techniques, a human may hand-label the location of objects of interest in the environment, such as traffic signage, vehicle lanes, bicycle lanes, crosswalks, stop lines, yield lines, and/or the like. According to the techniques discussed herein, a perception component of the vehicle may detect an object classification associated with sensor data and may generate a label associated with the sensor data. This label may be used to annotate the map data as a map element indicating the existence of traffic signage, a passenger drop-off or pickup zone, lane indication(s), a blind spot, intersection or other roadway junction, a drivable surface, stop lines, yield lines, and/or the like.

The remote computing device may transmit such a representation of the environment including map elements/annotations (and updated map element(s)) to an autonomous vehicle, which the autonomous vehicle may use to navigate an environment safely and efficiently. For example, the autonomous vehicle may use the map to determine where the vehicle is in the environment, where a drivable surface area is, where static objects are in the environments, where drop-off locations exist, where landmarks are, etc., and may use such determinations to determine a trajectory for controlling motion of the autonomous vehicle. Additionally or alternatively, the autonomous vehicle may use the map data to correctly locate dynamic objects environment that the autonomous vehicle detects using sensor data received by the autonomous vehicle relative to key points, landmarks, static objects, etc. in the. In some examples, the vehicle may use the map data to determine a likelihood that an object is occluded and/or to increase or decrease a confidence that an object exists at a certain location (e.g., a dynamic object like a pedestrian is unlikely to be in the same position as a static object, such as a stop sign).

In some examples, a computing device may have determined a first pose graph (a graph representation of the multiple poses as nodes and associations, e.g., constraints, between such poses as edges in the graph, etc.) by aligning a first set of sensor data captured at different vehicle poses. This aligned sensor data may be used to generate the three-dimensional model of the environment. Generating the first pose graph may include estimating a first pose (i.e., position and/or orientation) of the vehicle associated with a first sensor data set and the relation of that first pose to another pose of the vehicle. For example, the vehicle may receive lidar data from one or more lidar sensor associated with the vehicle. This lidar data may include sets of data points, also referred to herein as point clouds, with each set of data points corresponding to a particular pose of the vehicle within the environment. In various examples, such a graph may represent connections between such poses (e.g., between subsequent poses along a trajectory) and/or as links between multiple poses within one or more trajectories having at least a portion of co-visible data points.

An additional set of sensor data may be received from the same or different vehicle at some point. This second set of sensor data may be associated with a same portion of the environment and may be use to update and/or correct the first pose graph. In some examples, a second pose graph may be determined based at least in part on the second set of sensor data. The trouble is, map elements are not so easily updated and aren't automatically updated with the underlying pose graph.

For example, the change between the first pose graph and the second pose graph may end up changing the three-dimensional representation of the environment and/or underlying assumptions for determining where a vehicle is in the environment. Therefore, a particular map element such as an indication that a portion of map data is associated with a drivable surface, may not correctly be indicated in an updated version of the map data. In the worst possible scenario, this may result in the map data indicating that a portion of the environment that is not a drivable surface is a drivable surface, which may result in an injury and/or damage to the vehicle.

The techniques discussed herein may alter the map element based at least in part on determining one or more nodes of the first pose graph that are nearest in distance to the map element. Nodes of the first pose graph are referred to herein as "source nodes" and nodes of the new pose graph are referred to herein as "target nodes." A mapping component may determine a target node associated with a source node. In a first example, the source node and target node may be known since the pose graph has been updated subject to a new optimization (or at least an iteration that is part of an optimization). In such an instance, the pose graph is not a new pose graph, but is a modified same pose graph. The pose nodes (and factors) may have unique identifications associated with them such that the updated pose nodes are easily identified. In an alternate example, the pose graph may be a new pose graph, in which case determining the target node associated with a source node may include determining a nearest (in distance) and/or most similar (in heading) node of the second pose graph to the source node.

In some examples, the mapping component may determine one or more source-target node pairs where the source node of a respective pair is within a threshold distance of the map element. In an additional or alternate example, a nearest n number of source-target node pairs may be used to determine source-target node pairs, where n is a positive integer (e.g., regardless of distance). In an additional or alternate example, a Gaussian process, such as Kriging, may use all the source nodes in the map to determine a modification to a map element. Note that source-target node pairs are also referred to herein as node pairs.

In some examples the mapping component may determine that there are less than n node pairs within the threshold distance. If the number of node pairs is less than that threshold, the mapping component may generate a notification and/or transmit the notification to a user computing device or the vehicle (e.g., indicating that an error occurred and/or that there is some risk that the map element may not be transformed accurately) and/or the mapping component may preserve the map element's location from a last version of the map or the map element may be modified based at least in part on a modification of a nearest m number of different map elements, where m is a positive integer (e.g., 1, 2, 3, 4, 5, or more—this number may depend on a proximity of the nearest map element(s), a density of the nearest map element(s), and/or a maximum distance from the map element that another map element may be used).

Upon determining a source node-target node pair, the mapping component may determine a transformation between the source node and the target node. For example, the mapping component may determine a difference between the source node and the target node and/or a function that would cause a vehicle to move from the source node to the target node. This translation may include, for example, a vector that indicates how the source node is different than the target node. In some examples, the mapping component may repeat determining a transformation for the nearest source-target node pairs to the map element, until a number of transformations equal to the number of pairs have been determined.

In some examples, the mapping component may determine a weight associated with a source-target node pair based at least in part on a distance between the source node of the pair and the map element location. In some examples, the weight may decrease as the distance increases. Various loss functions may be used to determine this weight and, in some examples, a weight may be determined for each source-target node pair of the nearest source-target node pairs to the map element. In some examples, the weights associated with these nearest source-target node pairs may be normalized to sum to 1.

The mapping component may determine an alteration to apply to the map element based at least in part on the transformations and weights associated with the source-target node pairs. For example, the alteration may itself be a transformation that alters a location and/or extents of the map element. In some examples, the mapping component may determine the alteration based at least in part on a weighted sum of the transformations (e.g., of the nearest n node pairs, node pairs with a threshold distance, or a combination thereof). In an additional or alternate example, the alteration to the map element may be part of an optimization of a plurality of map elements that include the map element. For example, the alteration to the map element may be based at least in part on altering the map element (and one or more other map elements) to reduce a difference between the alteration and to the map element and the weighted sum of the transformation associated with the map element, as determined above. As regards the other map elements, the respective alterations may be based at least in part on determining a total difference by summing these differences over the different map elements (and the respective weighted transformations) and the respective alterations may be altered to reduce the total difference.

Regardless, the resultant (altered) map element may be an updated map element that is included in second (updated) map data. This updated map data may be transmitted to the vehicle (or another vehicle) for use by the vehicle to control operation of the vehicle. The techniques discussed herein may require less computational resources, increase the accuracy of the map element locations and resultant map data, and improve the safety of vehicle(s) that use the map data by correctly locating map elements, such as drivable surfaces (e.g., a roadway versus a sidewalk), stop signs and/or stop lines, etc.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification.

It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a mapping component 114, and/or system controller(s) 116. Although depicted in FIG. 1 for illustrative purposes, it is understood that the mapping component 114 may reside in/on a separate computing device (or otherwise) than any one or more of the other components.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, such as a map data determined according to the techniques discussed herein, localization information (e.g., where the vehicle 102 is in the environment relative to a map and/or features detected by the perception component 110), and/or the like. In some examples, the perception component 110 may comprise a pipeline of hardware and/or software, which may include one or more GPU(s), ML model(s), Kalman filter(s), and/or the like.

For example, the map data may comprise map element(s) that indicate various key objects and/or regions in the environment, such as the location (and/or extents—i.e., the shape/size) of important objects or regions in the environment. These map element(s) may include, for example, an annotation that indicates a portion of map data, such as a two-dimensional representation of the environment associated with a drivable surface, a pedestrian conditional surface such as a crosswalk, a permanent pedestrian or cycling surface, a parking surface, traffic signage (e.g., stop light, stop sign, yield sign, speed sign, commuter lane, a construction sign), traffic indications (e.g., a stop line, a yield line, a crosswalk indication, a commuter lane indication, a traffic cone, a flare), various drop-off or pick-up zones, etc. In other words, the map indicates the significance of a portion of map data, regardless of whether the map data is two- or three-dimensional. Additional map data may be generated that may include a three-dimensional representation of the environment such as a mesh, wire frame model, polygons, surfels (e.g., polygons associated with individual color and/or intensity), and/or the like.

In some examples, the trajectory 118 may depend upon one or more of the map elements identified in the two-dimensional map. For example, trajectories generated for the vehicle may be based at least in part on traffic signage and may be bounded by a portion of the map data indicated (by a map element) as being a drivable surface, except in exigent circumstances or pickup/drop-off/parking scenarios where the vehicle may generate a trajectory that will result in the vehicle moving into a portion of the environment indicated in the map data as being associated with a cycling lane, parking region, pickup/drop-off area, or the like.

The trajectory 118 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. In some examples, the trajectory 118 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification, a region of interest (ROI) identifying a portion of sensor data associated with the object, and/or a confidence score indicating a likelihood (e.g., posterior probability) that the object classification is correct and/or a confidence score that the ROI is accurate. For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, velocity, acceleration, and/or heading of that object.

The data produced by the perception component 110 may be collectively referred to as perception data. Once the perception component 110 has generated perception data, the perception component 110 may provide the perception data to the planning component 112. The perception data may additionally or alternatively be stored in association with the sensor data as log data. This log data may be transmitted to the mapping component 114, which may execute on the computing device(s) 106 and/or at a remote computing device (unillustrated in FIG. 1 for clarity).

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In the depicted example, the perception component 110 may detect, based at least in part on sensor data (such as lidar data 120, although additional or alternate types of sensor data may be used), an object detection that may be used to generate a map element 122. The vehicle 102 may detect the object detection to generate the map element 122 as the vehicle executes trajectory 118 and passes through this portion of the environment. In some examples, determining the location and/or extents of the map element 122 may be based at least in part on the perception component 110 generating object detections associated with a portion of the environment that will become map element 122 from different poses of the vehicle 102 as the vehicle 102 traverses the environment. For example, vehicle 102 may generate a first object detection associated with map element 122 at pose 124 and a second object detection associated with the map element 122 at pose 126. A pose may comprise a heading and position. For example, pose 128 comprises position 130 and heading 132. The mapping component 114 may use the position and heading of the vehicle, indicated by a pose determined according to a localization technique, to determine a relative heading and position of an object detection. The mapping component 114 may estimate a location of an object in an environment, such as estimating a position and/or extents of map element 122 using detections associated with the map element 122 generated by the perception component 110 while the vehicle 102 was at pose 124 and pose 126.

In some examples, the mapping component 114 may determine a pose graph comprising one or more poses estimated by the vehicle as part of simultaneous localization and mapping (SLAM) techniques executed by a localization component of the mapping component. The SLAM techniques may comprise a Bayesian filter (such as a Kalman filter), bundle adjustment, maximum a posteriori estimation (MAP), and/or any simultaneous localization and mapping (SLAM) algorithm.

Estimating a pose node associated with a pose of the vehicle may include modifying a first estimated pose to increase a fit of/reduce the distance between a subset of lidar points of a first set of lidar points from a subset of lidar points of a second set of lidar points associated with a second estimated pose. A factor (constraint) between two poses may also be modified to fit the sets of sensor data together (e.g., by reducing the distance between lidar points of the two sets). The factor between these two estimated poses may be a constraint that identifies how the vehicle moved from one pose to the other. In some examples, the estimated poses and factors therebetween may be based at least in part on the sensor data (e.g., lidar data) and/or ancillary sensor data, such as inertial measurement unit (IMU) sensor data, odometry data (e.g., which may be based at least in part on data received from wheel encoder or other sensors), and/or the like. For example, the vehicle may use IMU data and/or odometry data to instantiate the pose estimates and/or a factor between two pose estimates and may refine these initial estimates using the lidar data. The resultant pose graph may be a graph whose nodes correspond to the poses of the vehicle at different points in space and whose edges represent constraints between the poses. The latter are obtained from observations of the environment or from movement actions carried out by the robot.

Note that, as used herein, a pose graph may include a factor graph that comprises pose nodes and edges (factors/constrains), where a node indicates a pose (i.e., position and orientation (e.g., two- or three-dimensional heading) of the vehicle within the environment/map) of the vehicle and an edge (also called a factor) indicates a set of constraints that define a relation of one pose (node) to another pose (node). In some examples, a confidence score, such as a covariance, may be associated with an edge. In some examples, the vehicle may determine a pose graph based at least in part on sensor data, including odometry data and/or inertial data. In some examples, a pose node may be associated with sensor data received by the vehicle over a time window.

In some examples, the factor/constraint (illustrated as arrows between the nodes in FIG. 1) between two pose nodes may identify a translation and/or rotation between a first pose node and a second pose node and a covariance associated therewith that indicates how likely the constraint is correct in any number or combination of variables. For example, the constraint may identify a distance between, steering data or difference in headings, and/or the like that may define how a vehicle in the first pose would come to arrive at the second pose. In some examples, the constraint 210 may additionally or alternatively include a time component, such as may be indicated by a velocity and/or acceleration. In some examples, a first confidence score may be associated with the constraint indicating a likelihood that the constraint is correct, and a second confidence score may be associated with the association of two pose nodes indicating a likelihood that the two pose nodes are associated with sensor data that was collected at those nodes and that the sensor data indicates at least a portion of the environment that is the same. In some examples, this association may be a closed-loop factor, although in other examples this may not be the case, such as where the association factor merely identifies that two poses are near enough to be associated with sensor data that includes the same object detections.

In some examples, the mapping component 114 may determine a preliminary pose graph that the vehicle 102 may transmit to a remote computing device. In some examples, the vehicle 102 may transmit object detection(s) and/or sensor data to the remote computing device in association with the preliminary pose graph. In an additional or alternate example, the map data may be entirely generated at a remote computing device based at least in part on sensor data received from the vehicle 102. In some examples, a mapping component 114 at the vehicle 102 may differ than a mapping component at a remote computing device. For example, the mapping component 114 at the vehicle may include components for localizing the vehicle 102 within the environment based on a map (e.g., the mapping component 114 may include a SLAM component). Additionally or alternatively, the mapping component 114 may include a component that generates a preliminary pose graph based at least in part on sensor data collected by the vehicle as part of SLAM operations. This preliminary pose graph may be transmitted to a remote computing device, which may refine the pose graph into a final pose graph for generating map data. In some examples, refining the pose graph may be based at least in part on sensor data received from multiple passes of the same location, whether from the same or multiple vehicles. This new sensor data may be used to re-determine an optimization of the pose graph that results in an update/correction to the pose graph. Note that the pose graph nodes are the same nodes and may just be altered according to a re-optimization of the pose graph.

For example, refining the preliminary pose graph into a first pose graph may include altering a pose node based at least in part on one or more factors associated with the pose node and the covariances associated therewith to reduce a distance between points in the first type of sensor data that are associated with a same object (i.e., a hard constraint) based on at least an iteration that is part of an optimization of the pose graph (whether or not a truly optimal pose graph is ultimately determined). An iteration of the optimization may comprise adjusting pose nodes and/or factors of the pose graph to reduce a loss determined for the pose graph as a whole or for at least a region of the pose graph. This iteration may additionally or alternatively be based on new sensor data. The final pose graph determined by the remote computing device may be used to determine that different sets of sensor data associated with different nodes are associated with a same object and may be used to generate a map. This map may include a representation of surfaces in the environment, such as a two- and/or three-dimensional model that may include a polygon mesh, wire frame model, and/or the like to represent the surfaces. For example and without limitation, FIG. 1 depicts such as representation 134 as a wire frame model, although it is understood that the map may additionally or alternatively comprise a two-dimensional map, such as the top-down view illustrated in FIG. 1 that has a semantic label associated with a location and/or region in the map associated with respective portions of the environment.

However, although the refinement to the pose graph(s) used to generate the map data may be used generate such a representation 134, map elements indicating key objects and regions in the environment are not so easily modified. When a correction 136 to a pose graph is received that modifies one or more pose nodes (illustrated as updated pose(s) 138 in FIG. 1) and/or factors/trajectories therebetween, the techniques discussed herein may be used to determine an updated map element 140, as discussed further below.

Example Process

Figure 2A:
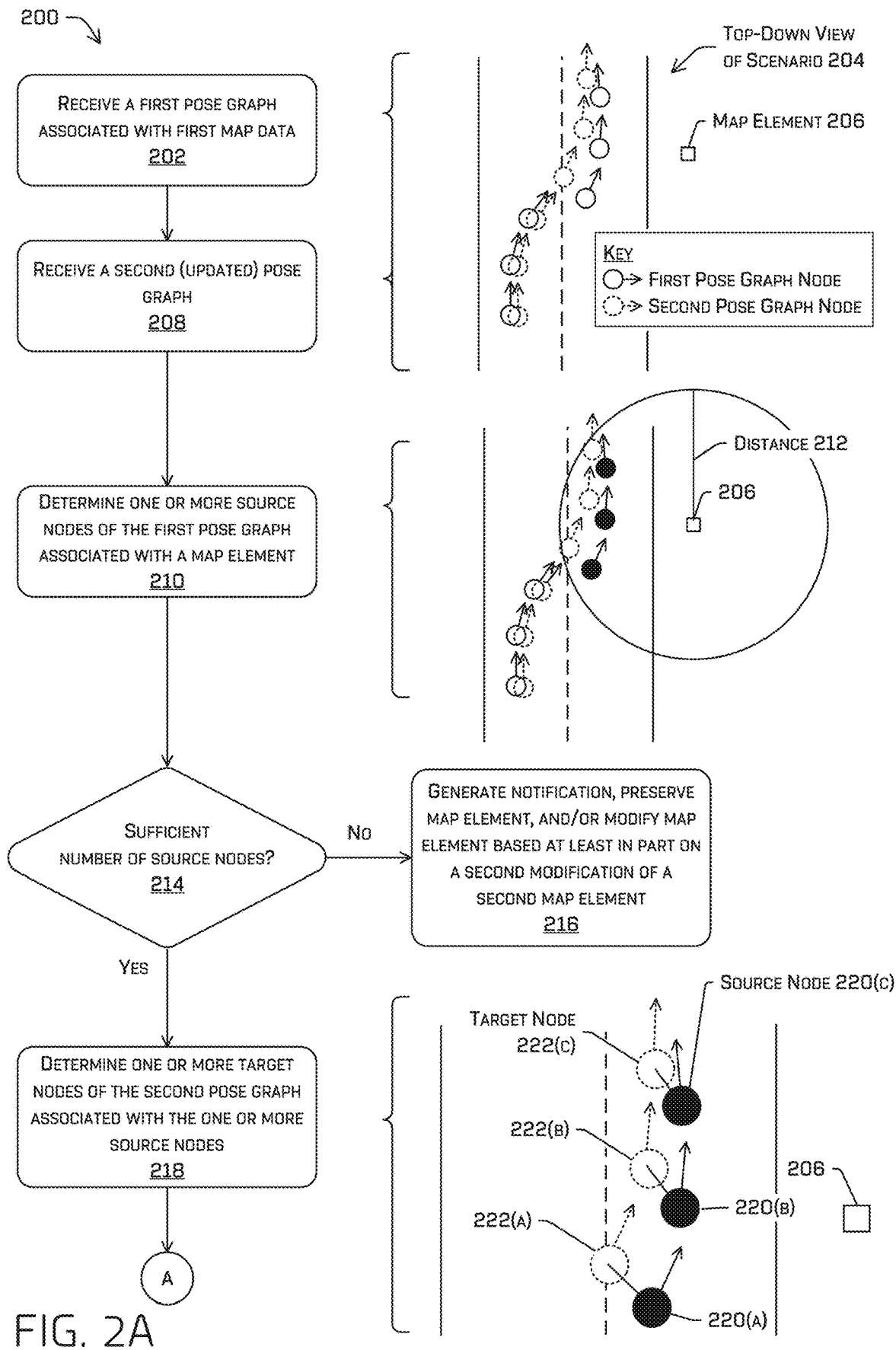
FIGS. 2A and 2B illustrate a pictorial flow diagram of an example process for adjusting map element(s) using at least two sparse pose graphs.
Figure 2B:
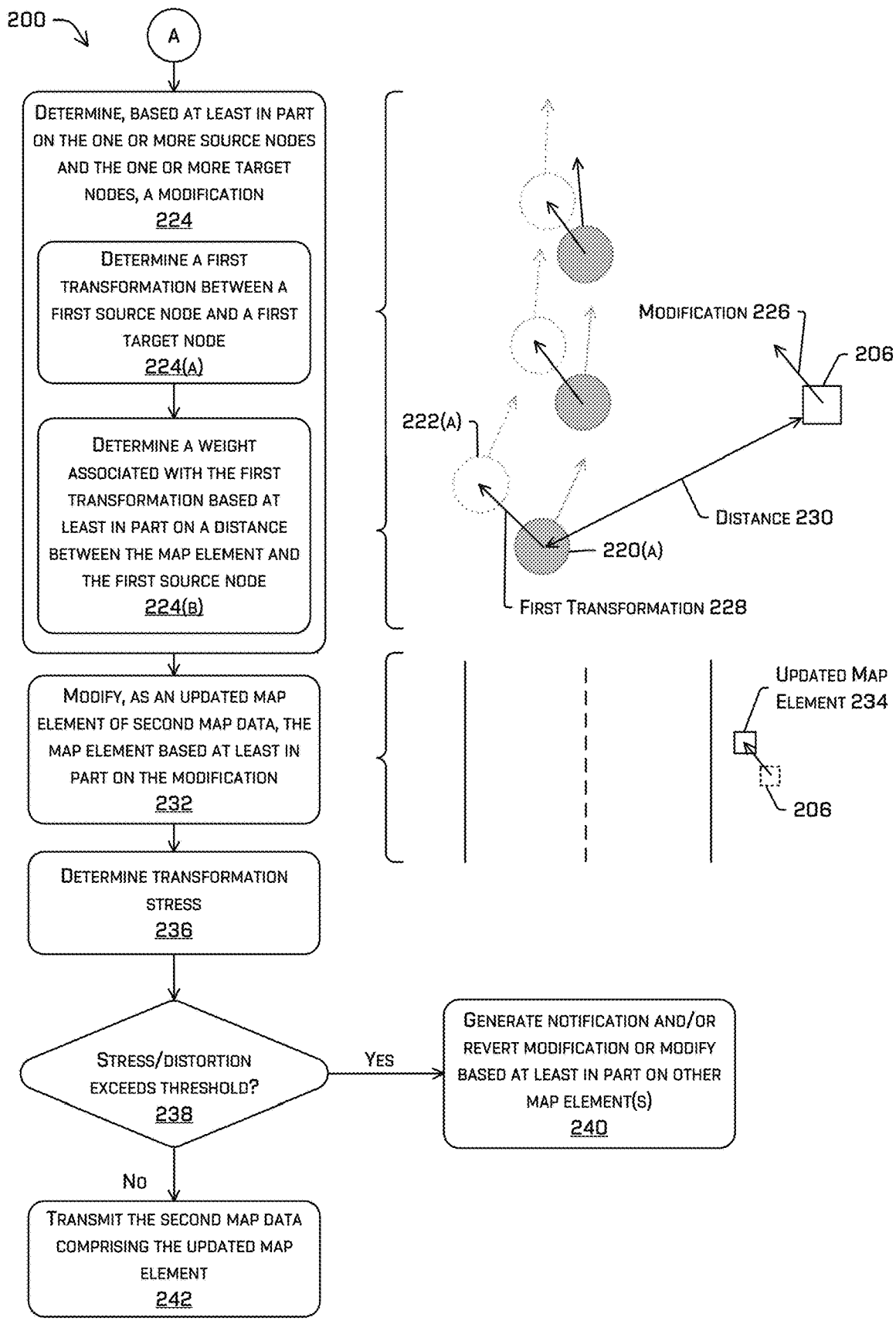

FIGS. 2A and 2B illustrate a pictorial flow diagram of an example process 200 for adjusting map element(s) using at least two sparse pose graphs. In particular, example process 200 may be used when an updated pose graph has been generated or received. In such an example, a preliminary pose graph may have already been determined, whether a preliminary pose graph that was determined by the vehicle, such as according to SLAM techniques executed by a vehicle computing device, or simply a previous version of the pose graph. In some examples, the pose graph may be a sparse graph that is determined based at least in part on various sensor data (e.g., by an optimization algorithm that tunes the pose graph to increase a degree of alignment of spatial and/or other types of sensor data according to constraints determined based at least in part on odometry data and/or inertial data). The pose graph may be sparse, in that there may be less nodes than there are sets of sensor data.

For example, 100 units of odometry data, 500 units of inertial data, and 30 units of lidar data may be captured over a same distance or time period, e.g., 1 meter or 1 second. The portion of the pose graph associated with that data collected over the 1 meter or 1 second may be represented as a single pose node, in at least one example and according to a sampling rate associated with the pose graph. In some examples, the updated pose graph may be a new version of the preliminary pose graph generated as at least part of an optimization or re-optimization of the pose graph, such as a next iteration of an optimization, a re-optimization based on new sensor data, and/or a re-optimization after optimization parameters have been altered, such as optimization constraints, a loss function, or the like.

At operation 202, example process 200 may comprise receiving a first pose graph associated with first map data, according to any of the techniques discussed herein. The first pose graph may be a preliminary pose graph, whether the preliminary pose graph was a pose graph determined by the vehicle 102 or a previous version of a pose graph that was refined by a remote computing device. The first map data may include a representation of the environment generated based at least in part on the first pose graph and/or a map element that identifies a portion of the environment as being associated with a key object or region, such as traffic signage (and type, such as stop sign, stop light, yield sign, speed sign), static objects (e.g., fire hydrant, mail box, light pole), key regions (e.g., drivable area, parking area, lane, turning lane, exit lane, merging lane, sidewalk, crosswalk, pedestrian zone, pickup and/or drop-off area, no idling zone), etc. FIG. 2A depicts a top-down view of a scenario 204 including a straight roadway and an example representation of the first pose graph. The first pose graph (or portion thereof) is depicted as solid circles (positions) and solid arrows (headings) and a map element position and extents are depicted as map element 206. Note that the first pose graph may include additional data, as discussed above, and the map element 206 may have previously been labeled using perception data generated by the vehicle or by a human.

At operation 208, example process 200 may comprise receiving a second (updated) pose graph, according to any of the techniques discussed herein. For example, remote computing device may refine a preliminary pose graph or determine a new pose graph based at least in part on a refining technique, modification to an optimization algorithm, next iteration of an optimization, and/or new sensor data. FIG. 2A depicts the second pose graph as dashed circles (positions) and dashed arrows (headings), although the second pose graph may include additional data, as discussed above.

At operation 210, example process 200 may comprise determining one or more source nodes of the first pose graph associated with the map element, according to any of the techniques discussed herein. The source nodes may be determined from the first pose graph. For example, operation 210 may comprise determining a nearest n nodes of the first graph to the map element 206, where n is a positive integer. In some examples, n may be a static number although in an additional or alternate example, n may be determined based at least in part on a density of the nodes of the pose graph. In some examples, a mapping component (of the vehicle or the remote computing device) may limit the search for the nearest node(s) to those first pose graph nodes within a threshold distance 212 of the map element 206, thereby ensuring that a correction to a distant node wouldn't affect the position and/or extents of the map element 206. In some examples, operation 210 may comprise ranking nodes within the threshold distance 212 of the map element according to least to greatest distance and selecting the top n (closest n) nodes to the map element. In an additional or alternate example, operation 210 may comprise determining the closest first pose graph pose node to the map element and determining the n−1 nearest first pose graph pose nodes to that nearest node. Additionally or alternatively, operation 210 may comprise determining the nearest n source node-target node pairs, source node-target node pairs within the distance 212, and/or a combination thereof.

At operation 214, example process 200 may comprise determining whether a number of source nodes (or source-target node pairs) identified at operation 210 meets or exceeds a lower threshold number, p, where p is a positive integer less than n, according to any of the techniques discussed herein. If the number of source nodes identified at operation 210 does not meet the lower threshold number (e.g., there are no source nodes within the threshold distance 212 of map element 206 or there are less source nodes within the distance 212 than a threshold number), example process 200 may continue to operation 216. If the number of source nodes identified at operation 210 meets or exceeds the lower threshold number, the example process 200 may continue to operation 218. In some examples, operation 214 may ensure that there is a sufficiently reliable number of source nodes available to determine an accurate modification to the position and/or extents of the map element. In some examples, operation 214 may be skipped.

At operation 216, example process 200 may comprise generating a notification, preserving the map element, and/or modifying the map element 206 based at least in part on a second modification of a second map element, according to any of the techniques discussed herein. In some examples, operation 216 may comprise generating and/or transmitting a notification to a user computing device indicating the map element 206 and/or a portion of the pose graph nearest to the map element 206. For example, the notification may include an indication that the map element 206 may be inaccurate and/or may include code executable to present a user interface option for providing a manual modification to map element 206. In some examples, the indication that the map element 206 may be inaccurate may be included in an updated map in association with map element 206, such that the planning component of the vehicle may use the indication in determining trajectories in a region near the map element 206. This may result in increasing a likelihood that the vehicle will bias trajectories away from the map element 206 in some cases.

At operation 218, example process 200 may comprise determining one or more target nodes (nodes of the second pose graph) associated with the one or more source nodes, according to any of the techniques discussed herein. In some examples, operation 218 may include identifying an updated version of a source node based on a node identifier that matches between the source node and the target node. For example, each node may be associated with a pose node identifier and a time stamp. Determining the target node may include determining an updated version of a pose node having the same pose node identifier and time stamp. This may be the case in examples where the updated pose graph may be a new version of a same pose graph, such as when new sensor data was received and the updated pose graph is received as at least part of a re-optimization of the pose graph, when optimization parameters have been altered (e.g., changing the constraints between nodes, changing the distance 212, changing the number n of nearest nodes used, substituting a type of solver, and/or the like), a next iteration of an optimization process occurs, or the like.

In additional or alternate examples, when a completely new pose graph has been received operation 218. In such an example, for a first source node such as source node 220(*a*), operation 218 may comprise determining a nearest node of the second pose graph to the first source nodes, i.e., target node 222(*a*). In an additional or alternate example, corresponding nodes may already be known, such as according to a technique where the pose graphs are determined using same or similar pose graph generation parameters, such as a same sampling rate, start location, and/or end location and some canonical indication that the pose nodes are located at a same location in the environment (e.g., using GPS data or a test course where the vehicle is driven in an exactly identical path). In the depicted example, three source nodes 220(*a*)-(*c*) may have been determined at operation 210 and three corresponding target nodes 222(*a*)-(*c*) may be determined at operation 218. FIG. 2A further depicts which nodes are associated with a line between source-target node pairs and by using matching sub-letters in the numeration (e.g., a first source-target node pair includes source node 220(*a*) and target node 222(*a*), a second source-target node pair includes source node 220(*b*) and target node 222(*b*)).

Turning to FIG. 2B, at operation 224, example process 200 may comprise determining, based at least in part on the one or more source nodes and the one or more target nodes (the one or more source-target node pairs determined at operation(s) 210 and 218), a modification 226, according to any of the techniques discussed herein. Operation 224 may comprise operation 224(*a*) and, optionally, operation 224(*b*). In some examples, operation(s) 224(*a*) and/or 224(*b*) may be repeated for up to all the source-target node pairs determined at operations 210 and 218—i.e., those source-target node pairs determined to be associated with map element 206.

At operation 224(a), example process 200 may comprise determining a first transformation 228 between a first source node 222(a) and a first target node 222(a), according to any of the techniques discussed herein. In some examples, determining the first transformation 228, depicted as a line between source node 22(a) and target node 222(a), may comprise determining a difference in position, heading, and/or constraints between the node pair. In some examples, the transformation may be indicated as a transformation function, such as a linear transformation, geometric transformation, and/or non-linear transformation. In some examples, the transformation may be indicated in a tensor identifying three-dimensions or six degrees of freedom (e.g., x-, y-, z-, yaw, roll, pitch transformations).

At operation 224(b), example process 200 may comprise determining a weight associated with the first transformation based at least in part on a distance between the map element 206 and the first source node 220(a), according to any of the techniques discussed herein. The weight decreases an influence of a transformation determined for a source-target node pair upon the (final) modification 226 as the distance from the map element 206 to the source-target node pair increases. For example, a weight may be determined in association with the first transformation 228 based at least in part on a distance 230 of the first source node 220(a) from the map element 206. The modification 226 may be determined based at least in part on determining a weighted sum of the transformations determined for the source-target node pairs. In some examples, the weight may be determined using a first order, second order, or higher order function. For example, the modification 226, M, may be given by:

$$M = \Sigma f(d_i) T_i \quad (1)$$

Where f is the weighting function, $d_i$ is the distance from the map element 206 to the i-th source node of the set of source-target node pairs, and $T_i$ is the transformation of the i-th source node to the i-th target node. As an example, a first order weighting function could include:

$$f = norm\left(1 - \frac{d_i}{d_{thresh}}\right) \quad (2)$$

where $d_{thresh}$ is the threshold distance 212 and "norm" is a normalization of all the weights determined for the node pairs (e.g., such that the weights associated with the different node pairs sum to 1). Note that, if a pose node is located exactly at the map element location 206, the normalization and weighting would result in the pose node located at the map element location 206 predominantly or entirely influencing the modification to the map element location 206.

As an additional or alternate example, a second order weighting function could include:

$$f = norm\left(1 - \frac{d_i^2}{d_{thresh}^2}\right) \quad (3)$$

and an inverse function could include:

$$f = norm\left(\frac{d_{thresh}}{d_i}\right) \quad (4)$$

Any additional or alternate weighting functions may be used. An optimal weighting function would exhibit smoothness and continuity in the weights determined, although this isn't needful, as the inverse function is suitable but may have corners/discontinuities. In some examples, the weight may be determined using a robust loss function, such as a Cauchy loss, pseudo-Huber loss, Blake-Zisserman loss, Tukey loss, German-McClure loss, Welsch loss, and/or the like. In such an example, a robust loss function may help to ensure outlier transformations are disregarded or minimized in their effect on the final transformation. In some examples, the loss may iteratively be determined as iterations of transformations are determined as part of an optimization (e.g., determine weights, determine residuals/errors in an area of the map, alter the modifications to reduce the residuals, re-determine the eights, re-determine the residuals, and so on until the losses converge). In some examples, the loss function may reduce the influence of an outlier transformation or functionally remove such outlier transformation.

If weighting isn't used, the transformations associated with the node pairs may be averaged or otherwise amalgamated to determine modification 226. In examples where weights are determined, the modification 226 may be determined based at least in part on determining a weighted sum of the transformations determined at operation 224(a).

At operation 232, example process 200 may comprise modifying, as an updated map element 234 of second map data, the map element based at least in part on the modification 232, according to any of the techniques discussed herein. In some examples, operation 232 may comprise moving and/or updating extents of the map element 206 resulting in updated map element 234. Updating the extents of an object may comprise converting the extents to points (e.g., sampling the edges of a region defined as being associated with the map element), modifying those points according the transformation (discussed above), and fitting a polygon or other shape to the resultant modified points—that polygon or other shape defining the new extents of the map element.

At operation 236, example process 200 may optionally comprise determining a transformation stress, according to any of the techniques discussed herein. In some examples, the stress may be determined in association with a modification, such as modification 226. Additionally or alternatively, the stress may be determined for multiple modifications of map elements over a region. In some examples, determining the stress associated with a modification may comprise determining a residual associated with the modification (e.g., a loss determined by the loss function). In some examples, the residual may be based at least in part on the same or similar elements upon which the weight is based determined at operation 224(b). In an additional or alternate example, determining the stress may be based at least in part on a transform of a source node itself. For example, the transform may be converted from three- or six-dimensions to a single number, such as by determining a maximum value the transformation (in any of the dimensions), an average of the values of the transformation, a standard deviation of the transformation (and/or nearby transformations within a threshold distance). In an additional or alternate example, the stress may be the transformation itself. The stress at a location may additionally or alternatively be based at least in part on a number of source nodes upon which a modification was based (and whether that number meets or exceeds a threshold number), a variance of transformations in a region surrounding the location (e.g., in a same grid cell, within a threshold distance of the location, or the like), determining a difference between the transformation (source node to target node) and the modification to the map element (e.g., which may result in a vector or an average value may be determined based at least in part on the vector), or a combination of any of the factors discussed.

In some examples, a stress of a region may be determined by determining the stress of individual transformations in the region and determining a distribution and/or variance associated therewith. Regardless of whether individual stresses are determined or whether a stress associated with a region is determined a map may be generated in association with the stresses by associating determined stresses with locations associated with respective source nodes from which they were generated. Additionally or alternatively, for a location that doesn't have a source node associated with it, a value of the stress may be determined by interpolating a value of the stress based at least in part on previously determined stress of one or more nearby source nodes. In some examples, a visual representation of the stresses may be generated based at least in part on color or grayscale-coding the stresses based at least in part on a magnitude of the stresses. For a stress that meets or exceeds a threshold stress, example process 200 may continue to operation 240. For a stress below the threshold stress, example process 200 may continue to operation 242.

In some examples, operation 236 may additionally or alternatively comprise determining whether the map element 206 was modified similarly to source node(s) and/or other map element(s) nearby the map element 206, according to any of the techniques discussed herein. Operation 236 may ensure that the map element 206 was accurately updated and not updated based on an outlier or software bug. Determining the similarity may comprise determining a difference between the modification to the map element 206 and a transformation of a source node or a modification to a different map element. The difference may be indicated as a vector, in some examples, and/or in a heading and magnitude, tensor, or the like. In some examples, determining whether the modification 226 is similar to the other modification or transformation may comprise determining whether the difference is less than a threshold. In some examples, a total difference may be determined by averaging the differences between the modification 226 and multiple other transformation(s) and/or modification(s).

At operation 238, example process 200 may comprise determining whether the stress meets or exceeds a threshold stress. If the difference is greater than the threshold, example process 200 may continue to operation 240 ("Yes" prong). If the difference is less or equal to the threshold, example process 200 may continue to operation 242 ("No" prong). Determining whether the source node(s) and/or other map element(s) are "nearby" may include determining whether the source node(s) and/or other map element(s) are at a distance from the map element 206 that is less than a threshold distance. In some examples, this threshold distance may be greater than threshold distance 212, although in some examples, it may be the same or less than threshold distance 212.

At operation 240, example process 200 may comprise generating and/or reverting a modification or modifying the modification based at least in part on the modification of one or more other map element(s). For example, for a map element associated with a region of the environment that is associated with a stress value that meets or exceeds a threshold stress, a notification may be presented via a user interface for manual alteration and/or review of the modification. In some examples, stress(es) in the map having a value above a stress threshold, source node(s) that have a stress associated therewith that meet or exceed the threshold stress, or source nodes upon which a stress meeting or exceeding the threshold stress from which the stress value was interpolated may be color-coded with a different color to call attention to that portion of the map. Additionally or alternatively, the modification may be reverted. This reversion may happen automatically (without user input). In some examples, an automatic revision may generate a notification that may be presented via a user interface. Additionally or alternatively the reversion may occur responsive to user input that authorizes the reversion.

In an additional or alternate example, based at least in part on determining that the stress associated with a modification meets or exceeds a stress threshold, the system may alter the modification. Such an alteration may be based at least in part on the modification(s) to the nearest q number of other map element(s) that have been transformed, where q is a positive integer. A similar process to operation(s) 210, 214, and 224 may be used in generating a new modification based at least in part on the modification(s) to other map elements. For example, the nearest q map element(s) within a threshold distance of the map element 206 may be determined (with similar determinations as to whether a sufficient number or near enough map element(s) exist) and a weight may be determined in association with how those map element(s) were modified based at least in part on a distance between the map element 206 and the respective map element(s). These weights may be used to determine a new modification for the map element 206 by determining a weighted sum of modifications.

For example, determining the alteration may comprise determining an interpolation of the modification(s) the nearest q other map element(s), an average modification of the nearest q other map element(s), or the like.

At operation 242, example process 200 may transmitting the second map data comprising the updated map element to the vehicle or another vehicle, according to any of the techniques discussed herein. For example, FIG. 2B depicts the map data 242 as a three-dimensional wire frame model, although other examples are contemplated. In some examples, the map data may be transmitted to a fleet of vehicles. A vehicle may use the map data as part of SLAM operations to localize the vehicle within the environment, proceed cautiously in areas of the environment that include blind corners or other outlier conditions, etc.

Example Transformations and Modifications

Figure 3:
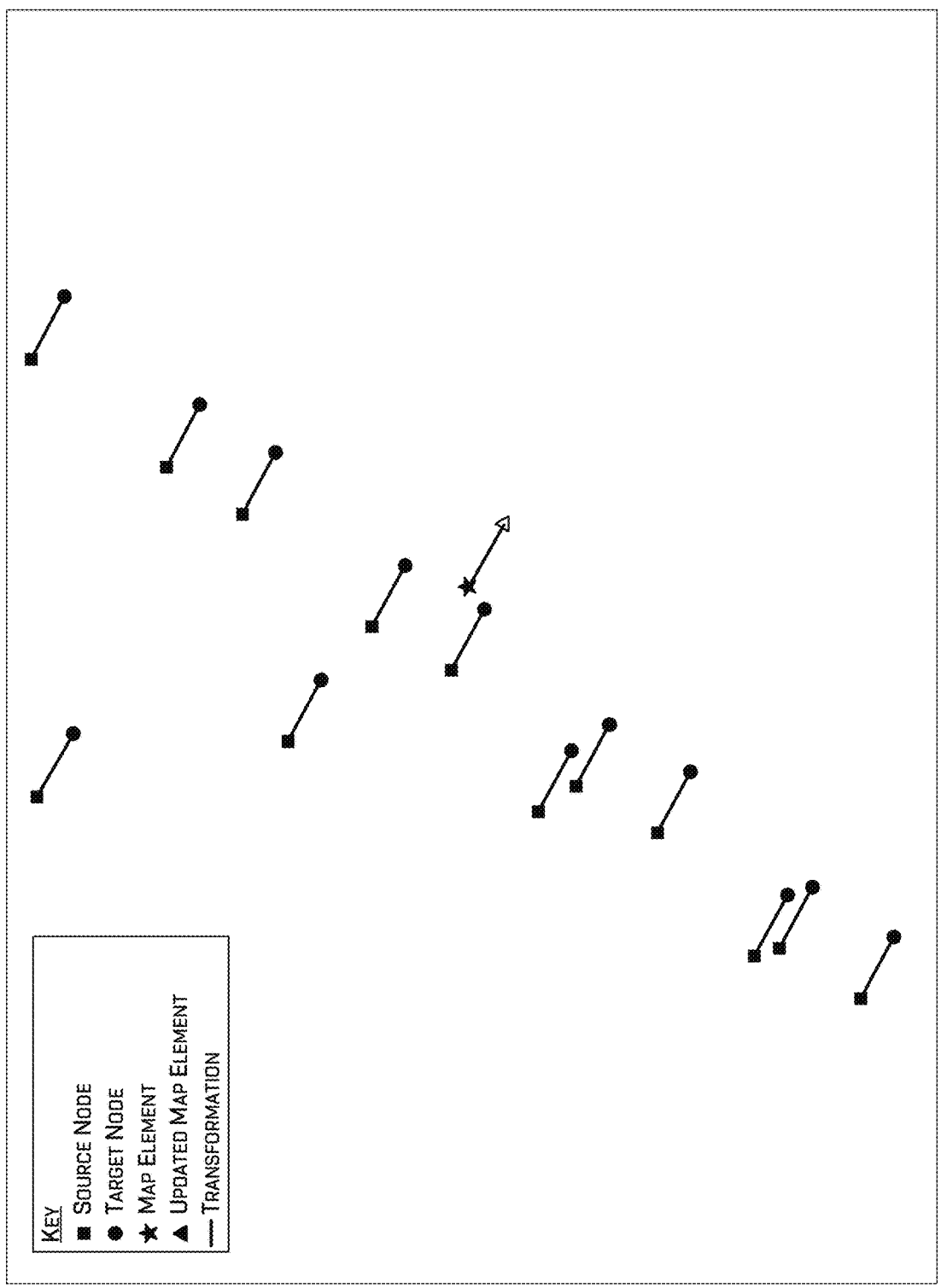
FIGS. 3-5 illustrate different transformations of map elements from simple to more complex examples using two pose graphs.
Figure 4:
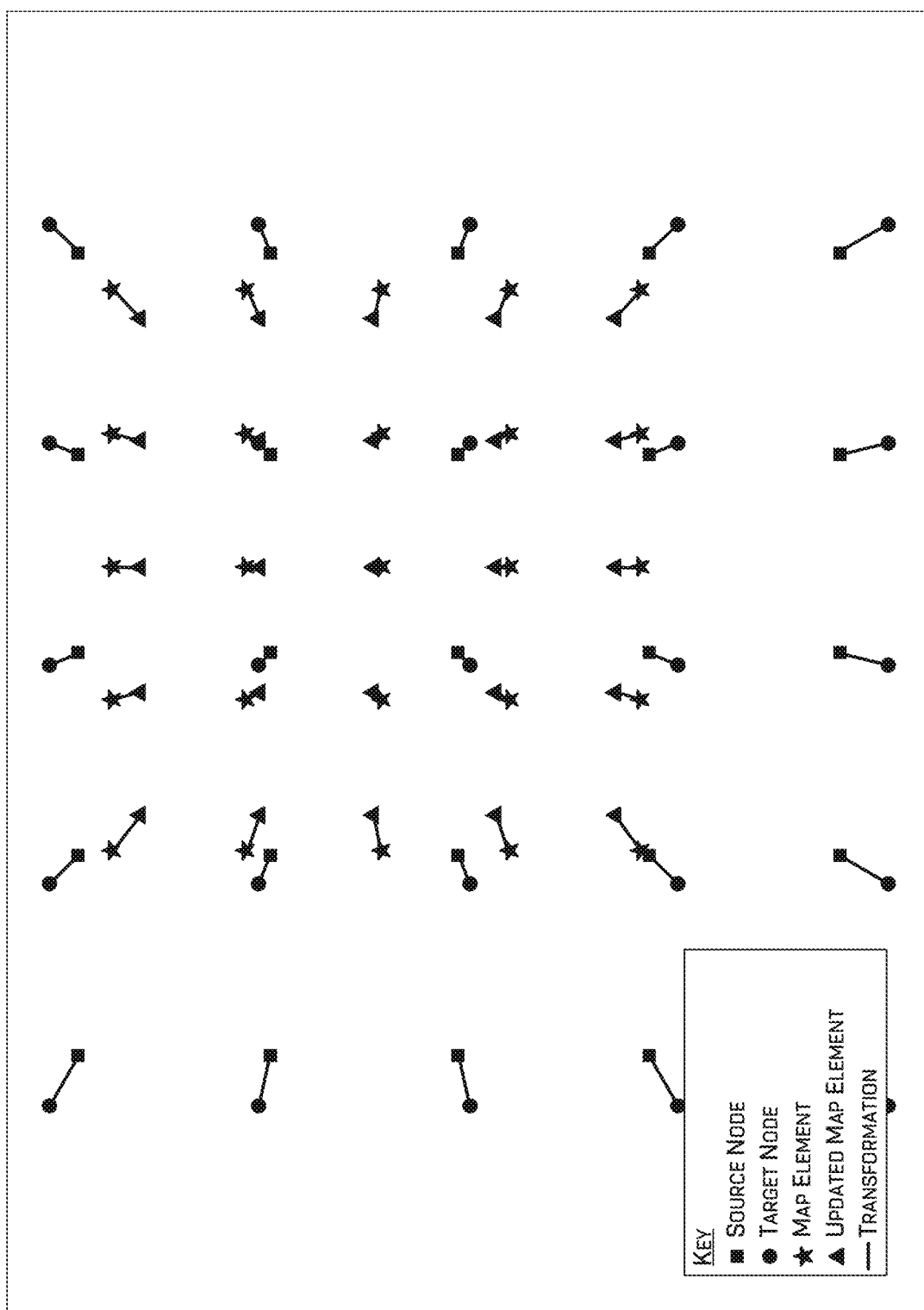
Figure 5:
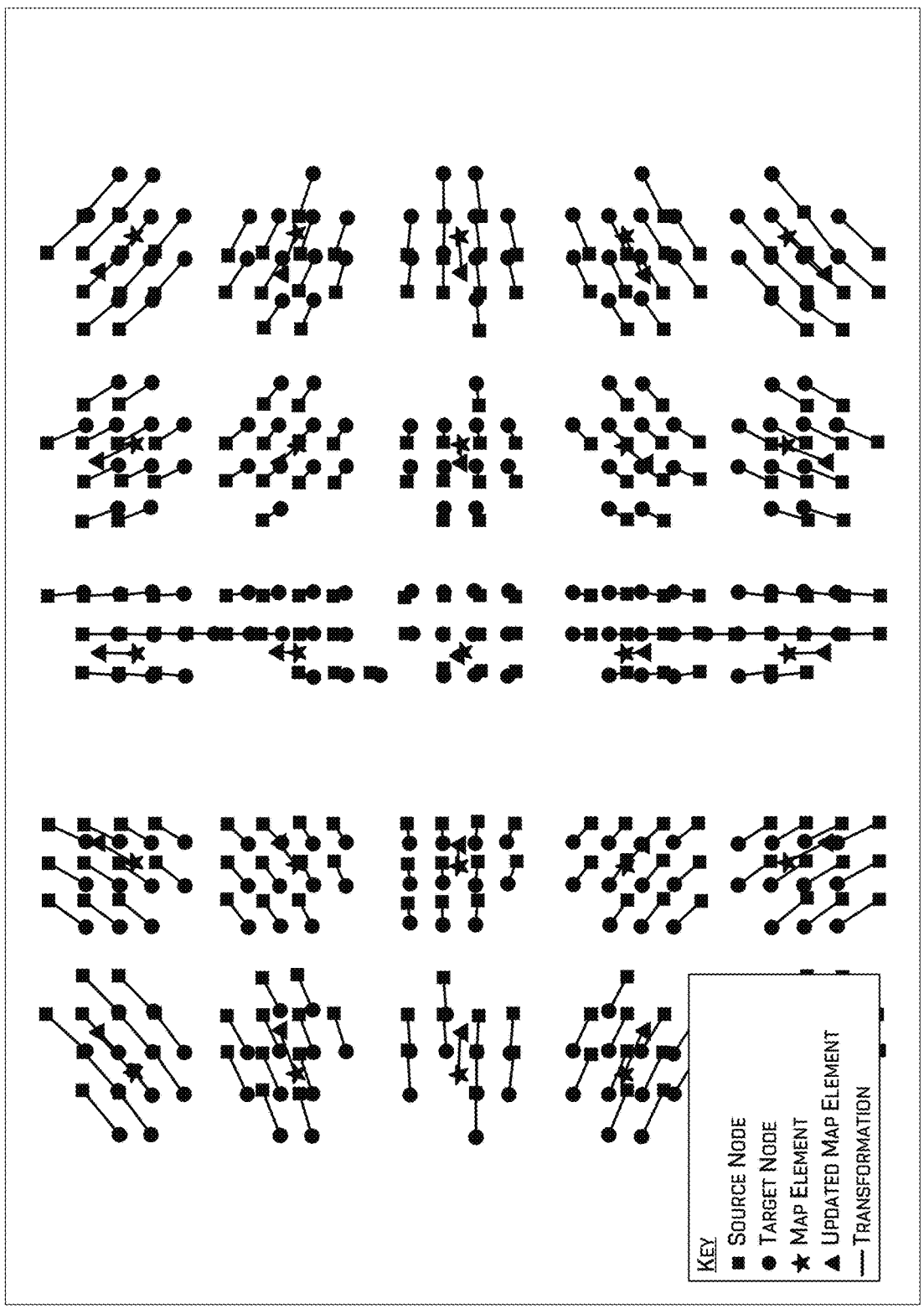

FIGS. 3-5 illustrate examples of source node-target node pairs, the transformations therebetween and the resultant modification(s) determined for map element(s) associated with the pose graphs according to the techniques discussed herein. The examples increase in complexity and number of map elements being modified. Notably, the figures illustrate two-dimensional transformations and the resultant modification of a map element in FIG. 3 and three-dimensional transformations and the resultant three-dimensional modifications of map elements in FIGS. 4 and 5. Also notable is the regional effect of the local transformations of source-target node pairs on a local map element. Distant node pairs do not affect distant map elements. FIGS. 3-5 depict source nodes of a first (preliminary or former) pose graph as squares, target nodes of a second (updated) pose graph as circles, map elements as stars, updated map elements as triangles, and the transformations between nodes/modifications between map elements as lines.

Example Stress Map

Figure 6:
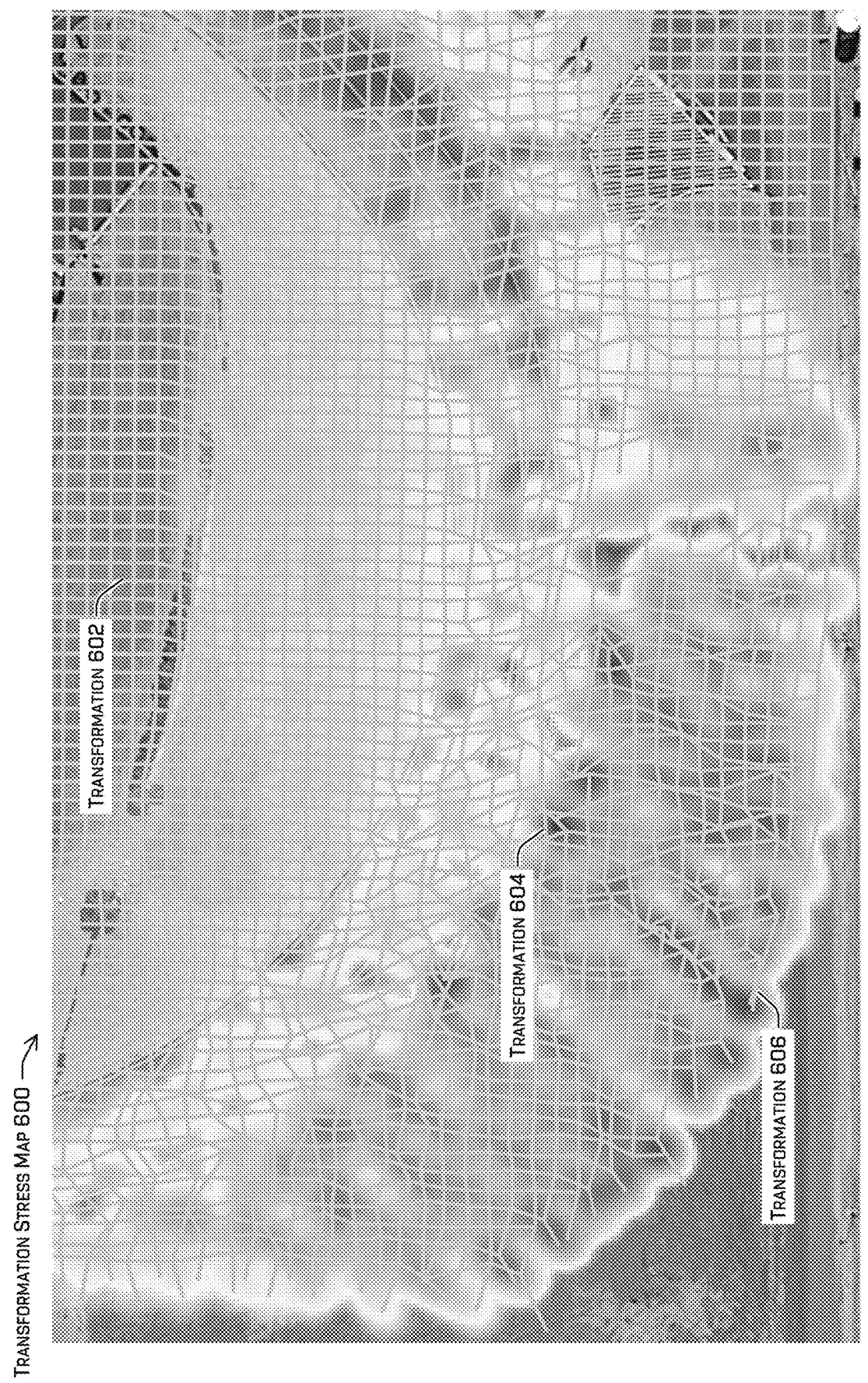
FIG. 6 illustrates an example stress/distortion map that may be generated as part of FIG. 2B.

FIG. 6 illustrates an example stress/distortion map that may be generated as part of FIG. 2B. The depiction of the stress map includes transformations depicted as lines overlaid a satellite image of an environment region. Before the modifications are made a grid may be overlaid the region to be updated and the grid may be warped according to the transformations and/or modifications as discussed above. For example, the grid may be generated in 5 meter by 5 meters squares or according to any other division. FIG. 6 includes multiple transformations, such as transformation 602, where no transformation occurred and the grid accordingly shows no distortion—the grid still appears uniform/square in such a region. In instances where the modifications were greater, the grid may show more distortion, such as at transformation 604 and/or transformation 606. FIG. 6 also includes a greyscale depiction of stress values coded darker to indicate higher stress and lighter to indicate lower stress. The areas of the environment around transformation 604 and transformation 606 include dark patches that indicate high stress values (e.g., stress values that meet or exceed a threshold). In some examples, the stress values may be thresholded so that only stress values that meet or exceed the threshold stress are depicted. FIG. 6 depicts such an instance, which is why the satellite image shows through at multiple points. Note that, although FIG. 6 is illustrated in greyscale, the stress map may be color-coded.

Example System

Figure 7:
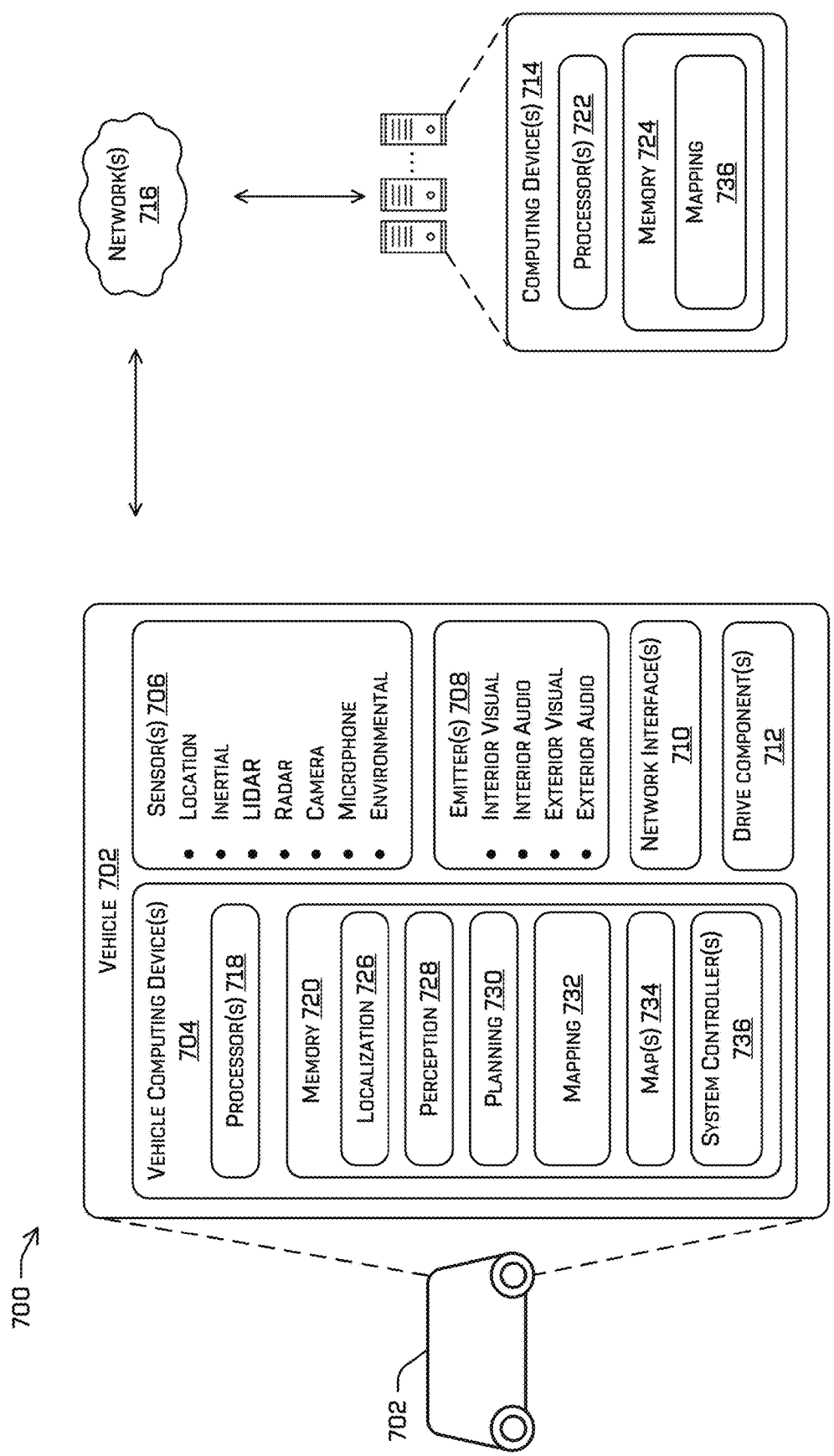
FIG. 7 illustrates a block diagram of an example system comprising a mapping component that may generate a pose graph, map element, and/or map data associated with an environment according to the techniques discussed herein.

FIG. 7 illustrates a block diagram of an example system 700 that implements the techniques discussed herein. In some instances, the example system 700 may include a vehicle 702, which may represent the vehicle 102 in FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 may include a vehicle computing device(s) 704, sensor(s) 706, emitter(s) 708, network interface(s) 710, and/or drive component(s) 712. Vehicle computing device(s) 704 may represent computing device(s) 106 and sensor(s) 706 may represent sensor(s) 104. The system 700 may additionally or alternatively comprise computing device(s) 714.

In some instances, the sensor(s) 706 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 714.

The vehicle 702 may also include emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) In this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). For instance, the network interface(s) 710 may facilitate communication with other local computing device(s) on the vehicle 702 and/or the drive component(s) 712. Also, the network interface (s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 714. In some examples, computing device(s) 714 may comprise one or more nodes of a distributed computing system (e.g., a cloud computing architecture).

The network interface(s) 710 may include physical and/or logical interfaces for connecting the vehicle computing device(s) 704 to another computing device or a network, such as network(s) 716. For example, the network interface(s) 710 may enable Wi-Fi-based communication such as via frequencies defined by the IEEE 700.11 standards, short range wireless frequencies such as Bluetooth®, cellular communication (e.g., 2G, 6G, 4G, 4G LTE, 5G, etc.) or any suitable wired or wireless communications protocol that enables the respective computing device to interface with the other computing device(s). In some instances, the vehicle computing device(s) 704 and/or the sensor(s) 706 may send sensor data, via the network(s) 716, to the computing device(s) 714 at a particular frequency, after a lapse of a predetermined period of time, in near real-time, etc.

In some instances, the vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 718 and memory 720 communicatively coupled with the one or more processors 718. Memory 720 may represent memory 108. Computing device(s) 714 may also include processor(s) 722, and/or memory 724. The processor(s) 718 and/or 722 may be any suitable processor capable of executing instructions to process data and perform operations as described herein. By way of example and not limitation, the processor(s) 718 and/or 722 may comprise one or more central processing units (CPUs), graphics processing units (GPUs), integrated circuits (e.g., application-specific integrated circuits (A SIC s)), gate arrays (e.g., field-programmable gate arrays (FPGAs)), and/or any other device or portion of a device that processes electronic data to transform that electronic data into other electronic data that may be stored in registers and/or memory.

Memory 720 and/or 724 may be examples of non-transitory computer-readable media. The memory 720 and/or 724 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 720 and/or memory 724 may store a localization component 726, perception component 728, planning component 730, mapping component 732, map(s) 734, and/or system controller(s) 736. Perception component 728 may represent perception component 110, planning component 730 may represent planning component 112, and/or mapping component 732 may represent mapping component 114. Memory 724 may store mapping component 736.

In at least one example, the localization component 726 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 726 may include and/or request/receive map(s) 734 of an environment and can continuously determine a location, velocity, and/or orientation of the autonomous vehicle within the map(s) 734. In some instances, the localization component 726 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 726 may provide data to various components of the vehicle 702 to determine an initial position of an autonomous vehicle for generating a trajectory and/or for generating map data, as discussed herein. In some examples, localization component 726 may provide, to the mapping component 732, a location and/or orientation of the vehicle 702 relative to the environment and/or sensor data associated therewith. In some examples, the localization component 726 may generate a preliminary pose graph and may associate a pose node with a window of sensor data in log data stored at memory 720. This log data (including the preliminary pose graph) may be transmitted to computing device(s) 714 over network(s) 716.

In some instances, perception component 728 may comprise a primary perception system and/or a prediction system implemented in hardware and/or software. The perception component 728 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 728 is referred to as perception data.

The planning component 730 may receive a location and/or orientation of the vehicle 702 from the localization component 726 and/or perception data from the perception component 728 and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 736 and/or drive component(s) 712 may parse/cause to be carried out, second instructions for the emitter(s) 708 may be formatted according to a second format associated therewith).

The mapping component 732 may operate in conjunction with localization component 726 to generate a preliminary pose graph and/or preliminary sensor data alignment for near-term planning and/or trajectory verification. In an additional or alternate example, the preliminary pose graph may be determined by the mapping component 732. In some examples, mapping component 732 may differ from mapping component 736 in that the mapping component 736 may conduct the soft-constraint optimization discussed herein. In an additional or alternate example, the soft-constraint optimization may also occur at mapping component 732. In some examples, a user may provide input at computing device(s) 714 via a user interface, such as to add or delete proposed locations or to fixate a portion of the pose graph. In some examples, the mapping component 736 may additionally or alternatively generate map data based at least in part on the refined pose graph and may transmit the map data to the vehicle 702, which may be stored in memory 720.

Although localization component 726, perception component 728, planning component 730, map(s) 734, and/or system controller(s) 736 are illustrated as being stored in memory 720, any of these components may include processor-executable instructions, machine-learned model(s) (e.g., a neural network), and/or hardware and all or part of any of these components may be stored on memory 724 or configured as part of computing device(s) 714.

As described herein, the localization component 726, the perception component 728, the planning component 730, mapping component 732 and/or 736, and/or other components of the system 700 may comprise one or more ML models. For example, the localization component 726, the perception component 728, and/or the planning component 730 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, ConvNeXt, and the like or visual transformers (ViTs), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like.

Memory 720 may additionally or alternatively store one or more system controller(s) 736, which may be configured to control steering, propulsion, braking, safety, emitters, communication, and other systems of the vehicle 702. These system controller(s) 736 may communicate with and/or control corresponding systems of the drive component(s) 712 and/or other components of the vehicle 702. For example, the planning component 730 may generate instructions based at least in part on perception data generated by the perception component 728, which the trajectory verification component 732 may validate and/or transmit to the system controller(s) 736. The system controller(s) 736 may control operation of the vehicle 702 based at least in part on the instructions received from the planning component 730. In some examples, these instructions may be based at least in part on map data generated according to the techniques discussed herein. In some examples, the trajectory verification component 732 may replace instructions generated by the planning component 730 with alternate instructions associated with a contingent trajectory such as, for example, a contingent trajectory that may specify an alternate maneuver, and/or the like.

It should be noted that while FIG. 7 is illustrated as a distributed system, in alternative examples, components of the vehicle 702 may be associated with the computing device(s) 714 and/or components of the computing device(s) 714 may be associated with the vehicle 702. That is, the vehicle 702 may perform one or more of the functions associated with the computing device(s) 714, and vice versa.

Example Clauses

A. A method comprising: receiving a first pose graph associated with first map data, the first pose graph comprising a first set of nodes indicating one or more of a position or orientation of a vehicle traversing an environment and the first map data comprising a map element indicating a first location of an object in the environment; receiving a second pose graph; determining a source node of the first pose graph associated with the map element; determining an association of a target node of the second pose graph with the source node; determining a transformation between the source node and the target node; modifying, as an updated map element of second map data, the map element based at least in part on the transformation; determining, based at least in part on at least one of the modification or the transformation, a stress; determining that the stress is less than a threshold stress; and transmitting, based at least in part on determining that the stress is less than the threshold stress, the updated map element to the vehicle or another vehicle to traverse the environment based at least in part on the updated map element.

B. The method of paragraph A, wherein determining the stress associated with a location in the environment is based at least in part on at least one of: determining whether the transformation meets or exceeds a transformation threshold; determining a variance associated with one or more transformations within a threshold distance of the location; determining a weight based at least in part on a distance between the map element and the source node; a loss determined by a loss function based at least in part on at least one of the transformation or a difference between the transformation and another transformation; an output of an optimization transforming two or more source nodes; determining that a number of additional source nodes used to determine the modification meets or exceeds a threshold; or determining a difference between the transformation and the modification.

C. The method of either paragraph A or B, wherein the map element is a first element and the method further comprises: determining a stress map based at least in part on interpolating a second stress value based at least in part on the stress and one or more other stress values; determining that the second stress value meets or exceeds the threshold stress; determining a second map element or a location in the environment is associated with the second stress value; and based at least in part on determining that the second stress value meets or exceeds the threshold stress at least one of: generating a notification associated with the second map element or the location in the environment; reverting a second modification associated with the second map element; or altering the second modification.

D. The method of any one of paragraphs A-C, wherein determining the modification comprises: determining a first weight based at least in part on a first distance between the map element and the source node, wherein modifying the map element is further based at least in part on the first weight.

E. The method of any one of paragraphs A-D, wherein determining the source node associated with the map element further comprises at least one of: determining a set of source nodes within a predefined distance of the first location of the map element; or determining n nearest source nodes to the first location of the map element, where n is a positive integer.

F. The method of any one of paragraphs A-E, wherein the modifying results in an alteration to at least one of the first location of the map element or a size of a dimension of the map element.

G. A system comprising: one or more processors; and a memory storing processor-executable instructions that, when executed by the one or more processors, cause the system to perform operations comprising: receiving a first pose graph associated with first map data; receiving a second pose graph; determining a source node of the first pose graph associated with a map element of the first map data; determining an association of a target node of the second pose graph with the source node; determining a transformation between the source node and the target node; modifying, as an updated map element of second map data, the map element based at least in part on the transformation; determining, based at least in part on at least one of the modification or the transformation, a stress; determining that the stress is less than a threshold stress; and transmitting, based at least in part on determining that the stress is less than the threshold stress, the updated map element to a vehicle to traverse an environment based at least in part on the updated map element.

H. The system of paragraph G, wherein determining the stress associated with a location in the environment is based at least in part on at least one of: determining whether the transformation meets or exceeds a transformation threshold; determining a variance associated with one or more transformations within a threshold distance of the location; determining a weight based at least in part on a distance between the map element and the source node; a loss determined by a loss function based at least in part on at least one of the transformation or a difference between the transformation and another transformation; an output of an optimization transforming two or more source nodes; determining that a number of additional source nodes used to determine the modification meets or exceeds a threshold; or determining a difference between the transformation and the modification.

I. The system of either paragraph G or H, wherein the map element is a first element and the method further comprises: determining a stress map based at least in part on interpolating a second stress value based at least in part on the stress and one or more other stress values; determining that the second stress value meets or exceeds the threshold stress; determining a second map element or a location in the environment is associated with the second stress value; and based at least in part on determining that the second stress value meets or exceeds the threshold stress at least one of: generating a notification associated with the second map element or the location in the environment; reverting a second modification associated with the second map element; or altering the second modification.

J. The system of any one of paragraphs G-I, wherein determining the modification comprises: determining a first weight based at least in part on a first distance between the map element and the source node, wherein modifying the map element is further based at least in part on the first weight.

K. The method of paragraph J, wherein determining the first weight is based at least in part on a robust loss function.

L. The system of any one of paragraphs G-K, wherein determining the source node associated with the map element further comprises at least one of: determining a set of source nodes within a predefined distance of the first location of the map element; or determining n nearest source nodes to the first location of the map element, where n is a positive integer.

M. The system of any one of paragraphs G-L, wherein the modifying results in an alteration to at least one of the first location of the map element or a size of a dimension of the map element.

N. The system of any one of paragraphs G-M, further comprising: determining a second modification for a second map element based at least in part on a second transformation between a second source node and a second target node; determining, based at least in part on at least one of the second transformation or the second modification, a second stress associated with the second modification; and determining that the second stress meets or exceeds a threshold stress at least one of: generating a notification associated with the second map element or the location in the environment; reverting a second modification associated with the second map element; or altering the second modification.

O. The method of paragraph N, further comprising: receiving user input associated with the second map element; and determining an alteration to the second modification based at least in part on the user input.

P. The system of any one of paragraphs G-O, wherein the first pose graph is determined based at least in part on first sensor data received from one or more sensors of the vehicle or another vehicle and the second pose graph is determined based at least in part on second sensor data received from the one or more sensors.

Q. A non-transitory computer-readable medium storing processor-executable instructions that, when executed by one or more processors, cause the one or more processors to perform operations comprising: receiving a first pose graph associated with first map data; receiving a second pose graph; determining a source node of the first pose graph associated with a map element of the first map data; determining an association of a target node of the second pose graph with the source node; determining a transformation between the source node and the target node; modifying, as an updated map element of second map data, the map element based at least in part on the transformation; determining, based at least in part on at least one of the modification or the transformation, a stress; determining that the stress is less than a threshold stress; and transmitting, based at least in part on determining that the stress is less than the threshold stress, the updated map element to a vehicle to traverse an environment based at least in part on the updated map element.

R. The non-transitory computer-readable medium of paragraph Q, wherein determining the stress associated with a location in the environment is based at least in part on at least one of: determining whether the transformation meets or exceeds a transformation threshold; determining a variance associated with one or more transformations within a threshold distance of the location; determining a weight based at least in part on a distance between the map element and the source node; a loss determined by a loss function based at least in part on at least one of the transformation or a difference between the transformation and another transformation; an output of an optimization transforming two or more source nodes; determining that a number of additional source nodes used to determine the modification meets or exceeds a threshold; or determining a difference between the transformation and the modification.

S. The non-transitory computer-readable medium of either paragraph Q or R, wherein the map element is a first element and the method further comprises: determining a stress map based at least in part on interpolating a second stress value based at least in part on the stress and one or more other stress values; determining that the second stress value meets or exceeds the threshold stress; determining a second map element or a location in the environment is associated with the second stress value; and based at least in part on determining that the second stress value meets or exceeds the threshold stress at least one of: generating a notification associated with the second map element or the location in the environment; reverting a second modification associated with the second map element; or altering the second modification.

T. The non-transitory computer-readable medium of any one of paragraphs Q-S, further comprising: determining a second modification for a second map element based at least in part on a second transformation between a second source node and a second target node; determining, based at least in part on at least one of the second transformation or the second modification, a second stress associated with the second modification; and determining that the second stress meets or exceeds a threshold stress at least one of: generating a notification associated with the second map element or the location in the environment; reverting a second modification associated with the second map element; or altering the second modification.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving a first pose graph associated with first map data, the first pose graph comprising a first set of nodes indicating one or more of a position or orientation of a vehicle traversing an environment and the first map data comprising a map element indicating a first location of an object in the environment;
   receiving a second pose graph;
   determining a source node of the first pose graph associated with the map element;
   determining an association of a target node of the second pose graph with the source node;
   determining a transformation between the source node and the target node;
   modifying, as a modification based at least in part on the transformation, the map element to determine an updated map element of second map data;
   determining, based at least in part on at least one of the modification or the transformation, a stress;
   determining that the stress is less than a threshold stress; and
   transmitting, based at least in part on determining that the stress is less than the threshold stress, the updated map element to the vehicle or another vehicle to traverse the environment based at least in part on the updated map element.

2. The method of claim 1, wherein determining the stress associated with a location in the environment is based at least in part on at least one of:
   determining whether the transformation meets or exceeds a transformation threshold;
   determining a variance associated with one or more transformations within a threshold distance of the location;
   determining a weight based at least in part on a distance between the map element and the source node;
   a loss determined by a loss function based at least in part on at least one of the transformation or a difference between the transformation and another transformation;
   an output of an optimization transforming two or more source nodes;
   determining that a number of additional source nodes used to determine the modification meets or exceeds a threshold; or
   determining a difference between the transformation and the modification.

3. The method of claim 1, wherein the map element is a first element and the method further comprises:
   determining a stress map based at least in part on interpolating a second stress value based at least in part on the stress and one or more other stress values;
   determining that the second stress value meets or exceeds the threshold stress;
   determining a second map element or a location in the environment is associated with the second stress value; and
   based at least in part on determining that the second stress value meets or exceeds the threshold stress at least one of:
   generating a notification associated with the second map element or the location in the environment;
   reverting a second modification associated with the second map element; or
   altering the second modification.

4. The method of claim 1, wherein the modification comprises:
   determining a first weight based at least in part on a first distance between the map element and the source node, wherein modifying the map element is further based at least in part on the first weight.

5. The method of claim 1, wherein determining the source node associated with the map element further comprises at least one of:
   determining a set of source nodes within a predefined distance of the first location of the map element; or
   determining n nearest source nodes to the first location of the map element, where n is a positive integer.

6. The method of claim 1, wherein the modifying results in an alteration to at least one of the first location of the map element or a size of a dimension of the map element.

7. A system comprising:
   one or more processors; and
   a memory storing processor-executable instructions that, when executed by the one or more processors, cause the system to perform operations comprising:
   receiving a first pose graph associated with first map data;
   receiving a second pose graph;
   determining a source node of the first pose graph, the source node associated with a map element of the first map data;
   determining an association of a target node of the second pose graph with the source node;
   determining a transformation between the source node and the target node;
   modifying, as a modification based at least in part on the transformation, the map element to determine an updated map element of second map data;
   determining, based at least in part on at least one of the modification or the transformation, a stress;

determining that the stress is less than a threshold stress; and transmitting, based at least in part on determining that the stress is less than the threshold stress, the updated map element to a vehicle to traverse an environment based at least in part on the updated map element.

8. The system of claim 7, wherein determining the stress associated with a location in the environment is based at least in part on at least one of:

determining whether the transformation meets or exceeds a transformation threshold;

determining a variance associated with one or more transformations within a threshold distance of the location;

determining a weight based at least in part on a distance between the map element and the source node;

a loss determined by a loss function based at least in part on at least one of the transformation or a difference between the transformation and another transformation;

an output of an optimization transforming two or more source nodes;

determining that a number of additional source nodes used to determine the modification meets or exceeds a threshold; or determining a difference between the transformation and the modification.

9. The system of claim 7, wherein the map element is a first map element and the operations further comprise:

determining a stress map based at least in part on interpolating a second stress value based at least in part on the stress and one or more other stress values;

determining that the second stress value meets or exceeds the threshold stress;

determining a second map element or a location in the environment is associated with the second stress value; and based at least in part on determining that the second stress value meets or exceeds the threshold stress at least one of:

generating a notification associated with the second map element or the location in the environment;

reverting a second modification associated with the second map element; or altering the second modification.

10. The system of claim 7, wherein the modification comprises:

determining a first weight based at least in part on a first distance between the map element and the source node, wherein modifying the map element is further based at least in part on the first weight.

11. The system of claim 10, wherein determining the first weight is based at least in part on a robust loss function.

12. The system of claim 7, wherein determining the source node associated with the map element further comprises at least one of:

determining a set of source nodes within a predefined distance of a first location of the map element; or determining n nearest source nodes to the first location of the map element, where n is a positive integer.

13. The system of claim 7, wherein the modifying results in an alteration to at least one of a first location of the map element or a size of a dimension of the map element.

14. The system of claim 7, further comprising:

determining a second modification for a second map element based at least in part on a second transformation between a second source node and a second target node;

determining, based at least in part on at least one of the second transformation or the second modification, a second stress associated with the second modification;

determining that the second stress meets or exceeds a threshold stress; and based at least in part on determining that the second stress meets or exceeds the threshold stress at least one of:

generating a notification associated with the second map element or a location in the environment;

reverting a second modification associated with the second map element; or altering the second modification.

15. The system of claim 14, further comprising:

receiving user input associated with the second map element; and determining an alteration to the second modification based at least in part on the user input.

16. The system of claim 7, wherein the first pose graph is determined based at least in part on first sensor data received from one or more sensors of the vehicle or another vehicle and the second pose graph is determined based at least in part on second sensor data received from the one or more sensors.

17. A non-transitory computer-readable medium storing processor-executable instructions that, when executed by one or more processors, cause the one or more processors to perform operations comprising:

receiving a first pose graph associated with first map data;

receiving a second pose graph;

determining a source node of the first pose graph, the source node associated with a map element of the first map data;

determining an association of a target node of the second pose graph with the source node;

determining a transformation between the source node and the target node;

modifying, as a modification based at least in part on the transformation, the map element to determine an updated map element of second map data;

determining, based at least in part on at least one of the modification or the transformation, a stress;

determining that the stress is less than a threshold stress; and transmitting, based at least in part on determining that the stress is less than the threshold stress, the updated map element to a vehicle to traverse an environment based at least in part on the updated map element.

18. The non-transitory computer-readable medium of claim 17, wherein determining the stress associated with a location in the environment is based at least in part on at least one of:

determining whether the transformation meets or exceeds a transformation threshold;

determining a variance associated with one or more transformations within a threshold distance of the location;

determining a weight based at least in part on a distance between the map element and the source node;

a loss determined by a loss function based at least in part on at least one of the transformation or a difference between the transformation and another transformation;

an output of an optimization transforming two or more source nodes;

determining that a number of additional source nodes used to determine the modification meets or exceeds a threshold; or determining a difference between the transformation and the modification.

19. The non-transitory computer-readable medium of claim 17, wherein the map element is a first map element and the operations further comprise:

determining a stress map based at least in part on interpolating a second stress value based at least in part on the stress and one or more other stress values;

determining that the second stress value meets or exceeds the threshold stress;

determining a second map element or a location in the environment is associated with the second stress value; and based at least in part on determining that the second stress value meets or exceeds the threshold stress at least one of:

generating a notification associated with the second map element or the location in the environment;

reverting a second modification associated with the second map element; or altering the second modification.

20. The non-transitory computer-readable medium of claim 17, further comprising:

determining a second modification for a second map element based at least in part on a second transformation between a second source node and a second target node;

determining, based at least in part on at least one of the second transformation or the second modification, a second stress associated with the second modification;

determining that the second stress meets or exceeds a threshold stress; and based at least in part on the second stress meeting or exceeding the threshold stress, at least one of:

generating a notification associated with the second map element or a location in the environment;

reverting a second modification associated with the second map element; or altering the second modification.

* * * * *